(No Model.)
J. GRIFFITHS.
PROCESS OF MAKING MALT LIQUORS.
No. 447,131. Patented Feb. 24, 1891.
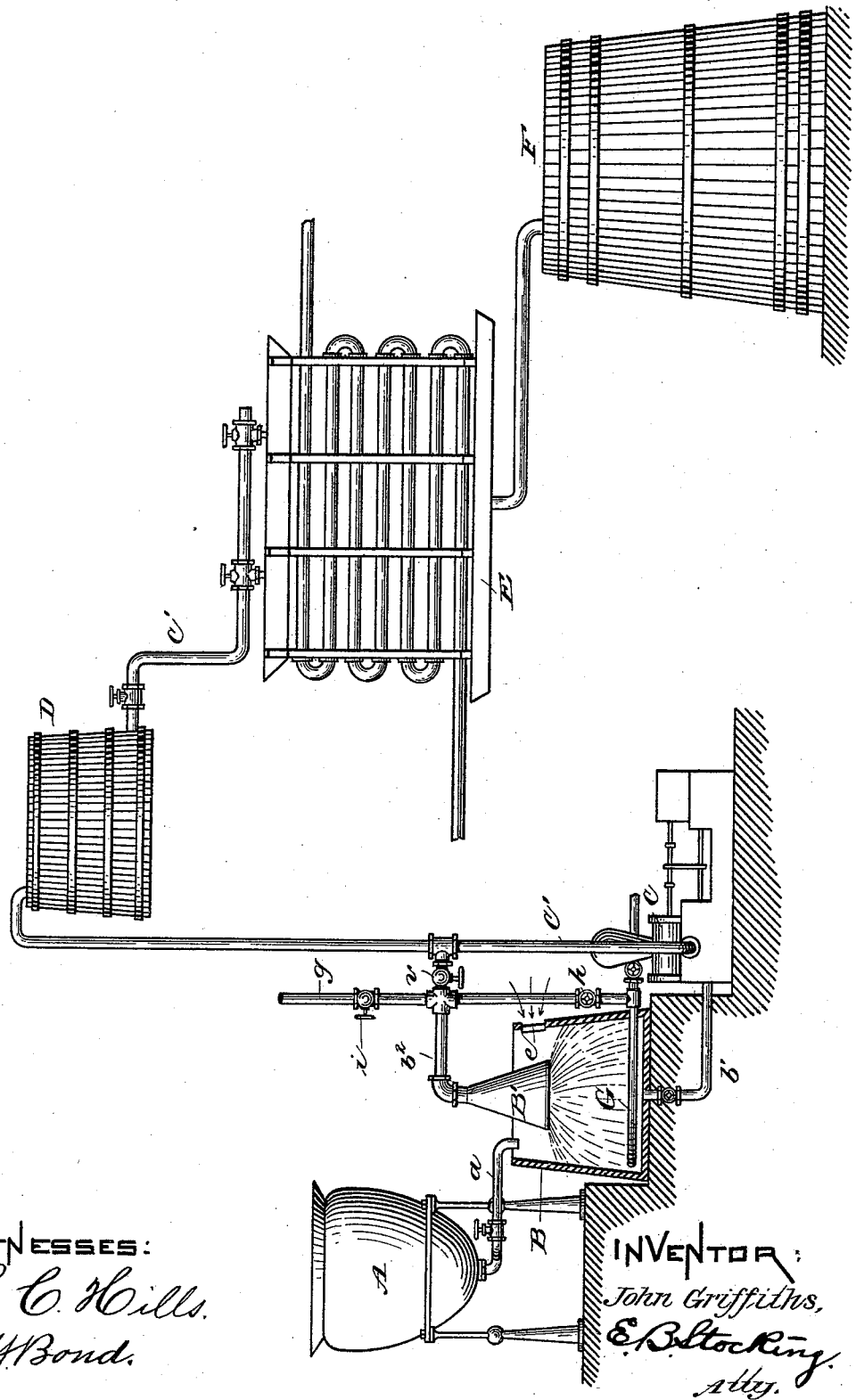
WITNESSES:
L. C. Hills.
E. H. Bond.
INVENTOR:
John Griffiths,
E. B. Stocking,
Atty.

UNITED STATES PATENT OFFICE.

JOHN GRIFFITHS, OF BROOKLYN, NEW YORK.

PROCESS OF MAKING MALT LIQUOR.

SPECIFICATION forming part of Letters Patent No. 447,131, dated February 24, 1891.

Application filed January 29, 1890. Serial No. 338,493. (No model.)

*To all whom it may concern:*

Be it known that I, JOHN GRIFFITHS, a citizen of the United States, residing at Brooklyn, in the county of Kings, State of New York, have invented certain new and useful Improvements in Processes of Making Malt Liquors, of which the following is a specification, reference being had therein to the accompanying drawing.

This invention relates to an improvement in the art of making malt liquors by which the quality of the liquor is improved, the cost of production reduced, a considerable saving effected in the time and appliances heretofore required, and a consequent gain realized in the capacity of a brewery.

In the process of making malt liquors heretofore in use the wort is drawn from the mash-tub into the hop-kettle and there boiled with the requisite quantity of hops, mainly for the purpose of coagulating the albumen, gluten, and other undesirable constituents of the wort in order to facilitate their subsequent removal. The entire infusion is thence drawn into the hop-back or hop-jack, and, after allowing a few minutes to settle and while still nearly at the boiling-point, is pumped into the surface cooler and there allowed to stand exposed to the air to settle and incidentally to cool. When settled to some extent, generally after standing five or six hours, the liquor is caused to flow from the surface cooler through a refrigerator or over a surface artificially cooled, so that its temperature is reduced to about 57° to 60° Fahrenheit for ales and 40° to 41° for lager, when it enters the fermenting-vats.

The above-described process is defective in respect to thoroughly oxygenating the liquid, which should be done at as high a temperature as possible, preferably not less than 180° Fahrenheit. It is further defective in respect to filtration, as when the infusion is drawn into the hop-back the hops are thoroughly mixed with the wort, and not having time to settle when pumped into the surface cooler some portion of them, with other undesirable matter, pass into that vessel or any substitute that may be used. The main object in allowing the liquid to stand several hours in the surface cooler is to enable the objectionable matter to settle to the bottom; but so much of this matter remains in the liquid and passes over the cooler and into the fermenting-vat that constant labor is required to keep the cooler clean, and it becomes necessary to skim the liquid in the vat.

The surface cooler herein mentioned is a large and shallow pan of many barrels capacity, placed on the top of a brewery, and in use requires to be protected, which protection is furnished by a wooden structure twelve feet high and upward, generally with slatted sides and forming part of the building.

My invention relates to the remedying of these defects by thoroughly filtering through the natural filter formed by the hops in the bottom of the hop-back and oxygenating the liquid and removing all the coagulated particles before it is finally drawn from the hop-back and while still at a high temperature, and then cooling the liquid while it is being drawn from the hop-back to pass to the cooler.

My improved method consists in the steps and succession of steps accomplishing the repeated filtering of the worts through the hops in the bottom of the hop-back, by drawing the worts from the bottom of the hop-back and forcing them through suitably-connected pipes and discharging them in fine spray back into the hop-back from the top and intermixing air with the worts during their passage through the pipe. This may be accomplished in any suitable manner. This operation is repeated until the worts are completely filtered and glass fine, showing no specks, which is usually accomplished in about twenty minutes. When in this condition, the worts are pumped into a receiving-tub, preferably so arranged as to allow them to flow from the tub by the force of gravity over the cooler and thence into the fermenting vat or tub. The flow of the liquid after completion of the filtering is continuous from the hop-back to the fermenting-vat, the object of the receiving-tub being to furnish a convenient means to allow the flow over the cooler.

To facilitate the cooling of the worts, I provide the hop-back with a coil of pipe and suitable connections to allow the flow of cold water through the pipe and its discharge heated by the heat absorbed from the worts. If the quality of the water thus used is fit for brewing, it can be discharged into the hot-water tub in its heated condition; or, if preferred, it can readily be utilized in scalding out the barrels. In either event the worts have been cooled by this water from 50° to 100° Fahrenheit, varying with the temperature of the air and water, resulting in a saving of time and in the same water being again used to the saving of time and fuel. Besides the complete filtration thus secured, the worts are thoroughly oxygenated in the process, and by means of the air forced into them by atmospheric pressure through the opening in the hop-back. By this method no time is lost in allowing the liquid to stand to settle or cool; but all the time is utilized with such effect as to allow three brewings where two are now made. The short time consumed in filtering enables the worts to be thoroughly oxygenated while still at a high degree of temperature, and, if desired, the water need not be allowed to flow through the pipes till this operation is completed, and the time necessarily consumed in pumping the worts from the hop-back, generally about two hours, is all utilized in cooling with the above-stated effect. The worts being completely filtered, the labor of constant cleaning of the coolers is saved, and the necessity of skimming the fermenting-tub is avoided until the tub or top begins to fall—say from thirty-five to forty-eight hours.

The accompanying drawing represents a sufficient portion of the apparatus to illustrate my improved method.

It is well known that the different pieces of apparatus are differently located in different breweries; but the location of the parts in relation to each other is immaterial to my process.

In the accompanying drawing, A designates the hop-kettle connected by the pipe $a$ with the hop-back B. From the bottom or other suitable part of the hop-back leads a discharge-pipe $b'$, through which the wort is drawn by the pump C to be forced through the pipe $C'$, and the valve $v$ being open through the pipe $b^2$, whence it is sprayed into the hop-back through the cone B', carried by the pipe $b^2$. The pipe $c'$ furnishes an outlet to the receiving-tub D, which receiving-tub is used instead of the surface cooler and does away with the necessity of the structure mentioned above to protect the surface cooler. From the receiving-tub the liquor passes, as in the old process, through suitable pipes over the cooler E and to the fermenting-vat F, and the subsequent processes are the same as now usually practiced. I admit air under atmospheric pressure to mix with the wort, and this may be admitted through an opening or trap-door $e$ in the side of the hop-back between the top of the same and the lower end of the cone, as shown in the drawing.

Within the hop-back I provide a coil G, connected by the pipe $g$ with a suitable source of water-supply, said pipe being provided with a cock $h$ below the pipe $b^2$ and with another cock $i$ above the same. The water, passing through this pipe and coil, serves to cool the wort. The flow of water through the coil and to the cone to mix with the wort may be regulated by means of the cocks $h$ and $i$.

By means of my process above described of filtering, oxygenating, and cooling the liquor a practical and material gain is made in the construction of the building by doing away with the wooden structure upon its top, and in the apparatus used by substituting for the large and expensive surface cooler a comparatively inexpensive tub, which is placed inside the building, and in the practice of the process the filtering is accomplished in about twenty minutes against five or six hours now consumed in allowing the liquid to settle, the liquid is cooled to a desired point at a great saving of time and power or ice, the water used in the pipes to cool the liquid can thus be heated and used for brewing or scalding to the saving of time, labor, and fuel, the resulting yeast is found to be much stronger, purer, and more healthy, the time of fermentation is shortened in the case of ales as much as one and one-half days, the beer is much improved in flavor and aroma, and in the case of lager and present-use ales is of much better keeping qualities.

What I claim is—

1. The process of making malt liquors, which consists in filtering the worts through a layer of hops and subsequently discharging the just-filtered worts in fine spray into the hop-back and intermixing air with said worts, substantially as specified.

2. The process of making malt liquors, which consists in passing the wort through a layer of hops and subsequently spraying the thus-filtered worts back through the layer of hops and simultaneously therewith oxygenating the worts, substantially as and for the purpose specified.

3. The process of making malt liquors, which consists in first passing wort through a layer of hops, mixing cold water therewith, subsequently supplying the mixture in the form of spray back onto and through the layer of hops, and at the same time oxygenating the same, as specified.

4. The process of making malt liquors, which consists in passing wort through a layer of hops, subsequently spraying and passing the wort through the hops and aerating the same, removing the coagulated particles while in the hop-back, and cooling the liquid in its passage through the hop-back to the cooler, substantially as described.

5. The process of making malt liquors, which consists in first passing wort through a layer of hops, repassing the mixture in the form of spray, admitting air under atmospheric pressure and mixing with the wort in its free passage through the worts, and cooling the liquor in its second passage through the hops, substantially as specified.

In testimony whereof I affix my signature in presence of two witnesses.

JOHN GRIFFITHS.

Witnesses:
ERWIN D. BUCKMAN,
W. W. BROWNELL.